T. Williams,
Sash Holder.
No. 984. Reissued June 12, 1860.
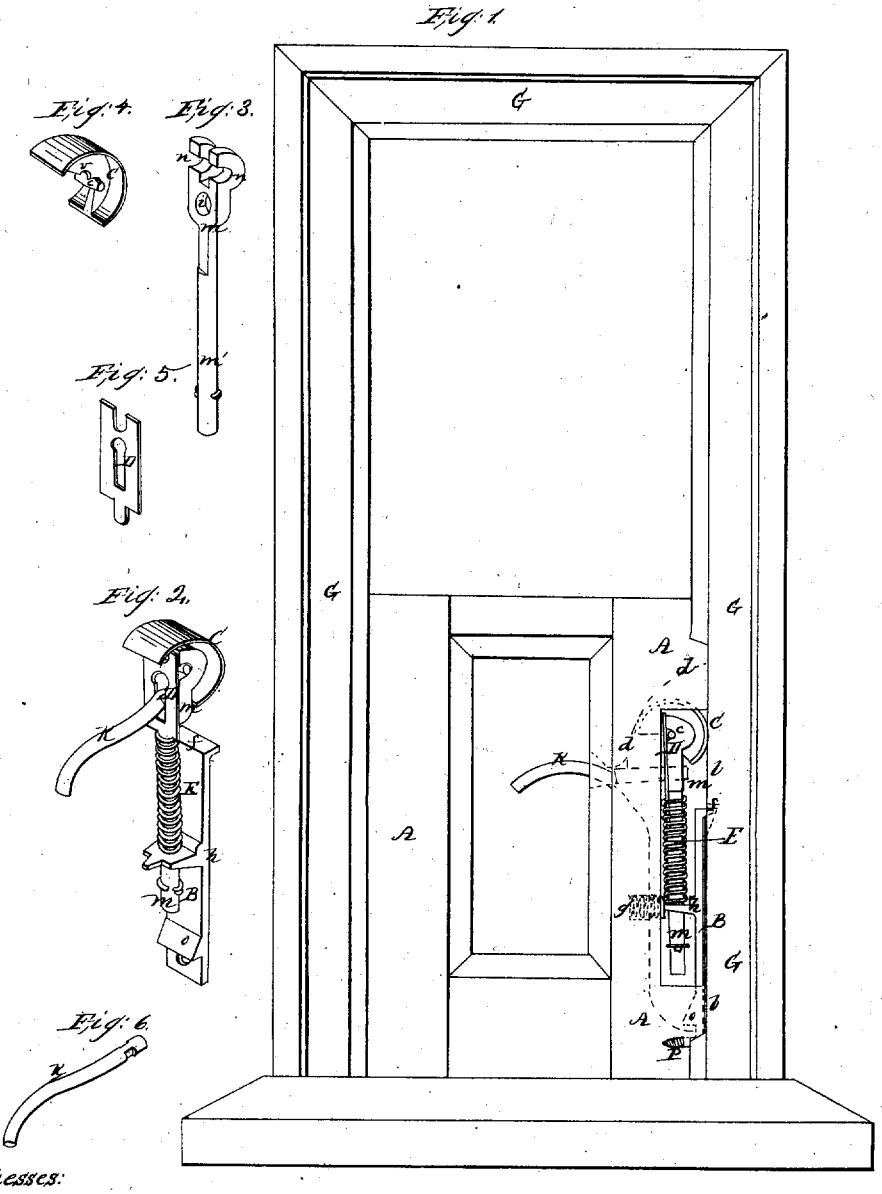
Witnesses:
Isaac A. Brownell
David Heaton 2d
Inventor:
Thomas Williams
N. PETERS, PHOTO-LITHOGRAPHER, WASHINGTON, D. C.

UNITED STATES PATENT OFFICE.

TURNER WILLIAMS, OF PROVIDENCE, RHODE ISLAND, ASSIGNOR TO HIMSELF AND DAVID HEATON, 2D.

IMPROVED WINDOW-STOP.

Specification forming part of Letters Patent No. 21,916, dated October 26, 1858; Reissue No. 984, dated June 12, 1860.

*To all whom it may concern:*

Be it known that I, TURNER WILLIAMS, of Providence, in the county of Providence and State of Rhode Island, have invented a new and Improved Window-Stop, which is self-acting and serves to stop the descent of an uplifted sash and to support the same; and I do hereby declare that the following is a full, clear, and exact description thereof, reference being had to the annexed drawings, making part of this specification, in which—

Figure 1 is a view of the window frame and sash, with the stop combined with a fastening applied. Fig. 2 is a perspective view of the said stop and fastening detached. Figs. 3, 4, 5, and 6 are details to be referred to hereinafter in the course of the description. Fig. 7 is a view of the stop above applied to the window-sash.

Similar letters of reference, where they occur, denote like parts in the different figures.

G in the said drawings is the window-frame. A is the sash surrounding and inclosing the stop, the latter being let into a recess mortised into the edge of the sash, as shown. It may also be inclosed within a hollow casting, suitably arranged for its reception and secured upon the outer surface of the sash in case the sash is not of sufficient thickness to be mortised. The surface represented by the dotted line *d* in the upper part of the recess is inclined with respect to the edge *l l* of the window-frame and forms in connection therewith a hollow wedge. A roller, C, is interposed between these two surfaces, having an axis, *c*, upon which it turns in bearings formed by the notches in the forked portion of the shank *m*, upon each side of said roller. The spindle *m'* of this shank is encircled by the sprial spring E, resting upon a projection, *h*, through a hole in which said spindle slides vertically, thus forming a guide to the roller. The upper end of the spring presses against the lower edge of plate D, upon each side of the projecting tongue thereon, and presses the said plate upward against and into the notch *v*, formed in the rib-plate of the roller, the upper edge of plate D being notched to take in the said rib-plate, and projects above the edge upon each side thereof, by which arrangement the action of the spring serves both to press the roller upward against the surfaces *d* and *l* and to present the same points of contact upon the face of the roller constantly to be acted upon by the said surfaces. The lever *k* is confined to the shank *m* in a loose joint by means of notches formed upon each side, upon the straight end of the same, which receive the sides of the opening in plate D, and from thence projects through hole *i* in the shank, by which it is held in its place.

The only office of the lever is to withdraw the roller from contact with the surfaces *d* and *l*, thereby destroying the nipping action, which stops the descent and supports the weight of the sash. This is effected by pressing the curved end of the lever upward and against the action of spring E, said spring pressing the roller into constant action at all times when not thus controlled by the lever.

The roller is formed, as shown in Fig. 4, that the forked portion of the shank, which forms a bearing for its axis, shall not be of greater width than the face of the roller, for the accommodation of which a wider recess would be required; and the arrangement of the plate D therewith, in connection with spring E, is employed simply to render such a construction of the roller equally effective with an entire revolving cylinder, and is therefore merely a matter of construction for the sake of economy.

The projection *h* is a stationary piece of metal secured to the sash within the recess, where the stop alone is applied, as shown in Fig. 7. When the stop is combined with a spring-catch, B, for fastening the window down, said projection may form a part of such catch, as shown in Figs. 1 and 2, and being so arranged serves to connect the action of the stop with that of the fastening, with the assistance of the wedge-shaped projection *o*, down the surface of which the end of the spindle *m'* slides on, pressing the lever *k* upwards, when by the roller and the projection *f* upon the catch-piece, are both withdrawn and held from contact with the window-frame, said catch being forced outwardly when not thus controlled by the direct action of spring *g* at the top end, it being secured at the lower end in a swinging joint by the screw *p*, as shown.

The relative position of the parts composing the window-stop herein above presented, as well as the form of such parts, may be considerably varied without essentially altering the combination or the effect produced thereby.

Having thus fully described my machine, I do not wish to be understood as claiming "a lever with a roller upon an axle or pivot, arranged and operating in an inclined groove," the same having been previously patented by Chas. H. Dana, August 5, 1856. Neither do I claim "combining with a roller and an inclined surface, serving as a stop and support by a nipping action, a spring-catch having a locking action," "by means of a shank or guiding piece and a spring or constant force," said combination being made the subject of a separate patent, for which an application has been made in due form, and filed in the Patent Office under date of May 11, 1860.

What I claim as my invention, and desire to secure by Letters Patent, is—

The within-described window-stop, consisting of the roller C, the shank *m*, spring E, and lever K, or their equivalents, in combination with the inclined surface *d*, and operating substantially as set forth.

TURNER WILLIAMS.

Witnesses:
ISAAC A. BROWNELL,
DAVID HEATON 2d.